United States Patent [19]
Levine

[11] 4,438,459
[45] Mar. 20, 1984

[54] MULTIPLEX PHOTOCOPIER SYSTEM WITH PORTABLE SCANNER

[76] Inventor: Alfred B. Levine, P.O. Box 9516, Washington, D.C. 20016

[21] Appl. No.: 378,577

[22] Filed: May 17, 1982

Related U.S. Application Data

[60] Division of Ser. No. 84,851, Dec. 4, 1979, and Ser. No. 925,290, Jul. 17, 1978, Pat. No. 4,251,153, said Ser. No. 925,290, is a continuation-in-part of Ser. No. 718,260, Aug. 27, 1976, Pat. No. 4,182,569, and Ser. No. 775,480, Mar. 8, 1977, abandoned.

[51] Int. Cl.³ .............................................. H04N 1/20
[52] U.S. Cl. .................................. 358/258; 358/286; 355/8; 355/14 C; 355/89
[58] Field of Search .................. 355/14 C, 8, 89, 40, 355/80; 358/256, 257, 258, 286

[56] References Cited

U.S. PATENT DOCUMENTS

| | | | |
|---|---|---|---|
| 3,409,363 | 11/1968 | Matthaes | 358/89 |
| 3,825,338 | 7/1974 | Kolibas | 355/8 |
| 4,133,477 | 1/1979 | Marino et al. | 355/14 C |
| 4,162,848 | 7/1979 | Platt | 355/14 C |
| 4,383,277 | 5/1983 | Kubo | 358/258 |

*Primary Examiner*—John C. Martin
*Assistant Examiner*—Edward L. Coles

[57] ABSTRACT

A multiplexing electrostatic copier system employing one or more detachable portable optical reader units, each including a "memory" or recorder, that may be readily carried about by a user for temporarily recording a "video" image of a printed document or other object to be copied or reproduced. For reproducing the recorded video image, the portable units are selectively connectable to an electrostatic copy making machine at the convenience of the users to transfer the remembered or recorded "video" images to the copy machine for reproducing the stored images and preparing a hard copy of the original document, e.g. a printed copy document on paper. The copier machine may also provide an advanced visual display of each of the transferred "video" images, enabling the users to initially observe the images before the hard copies are made.

10 Claims, 18 Drawing Figures

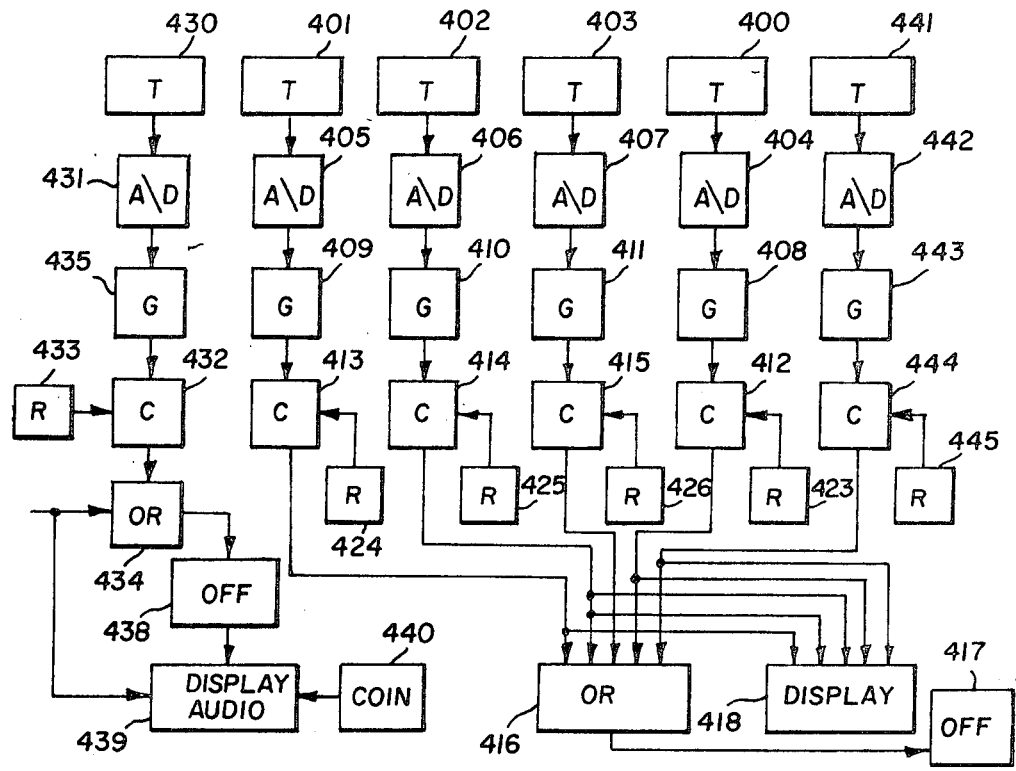
FIG. 11
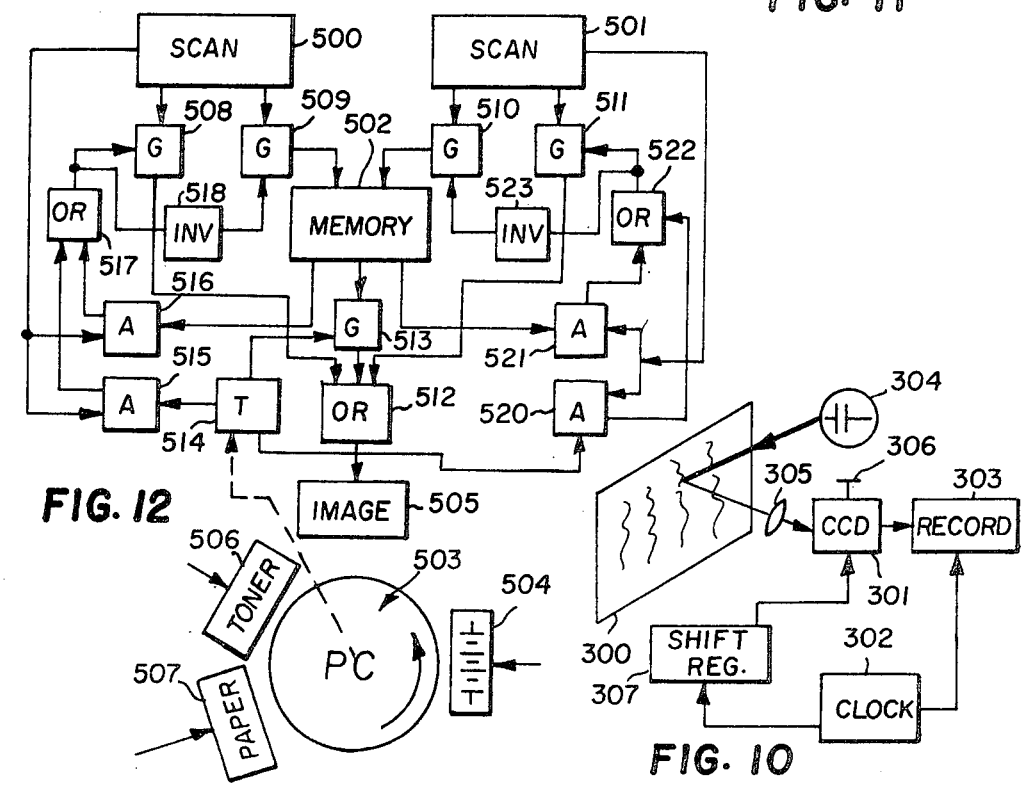
FIG. 12
FIG. 10

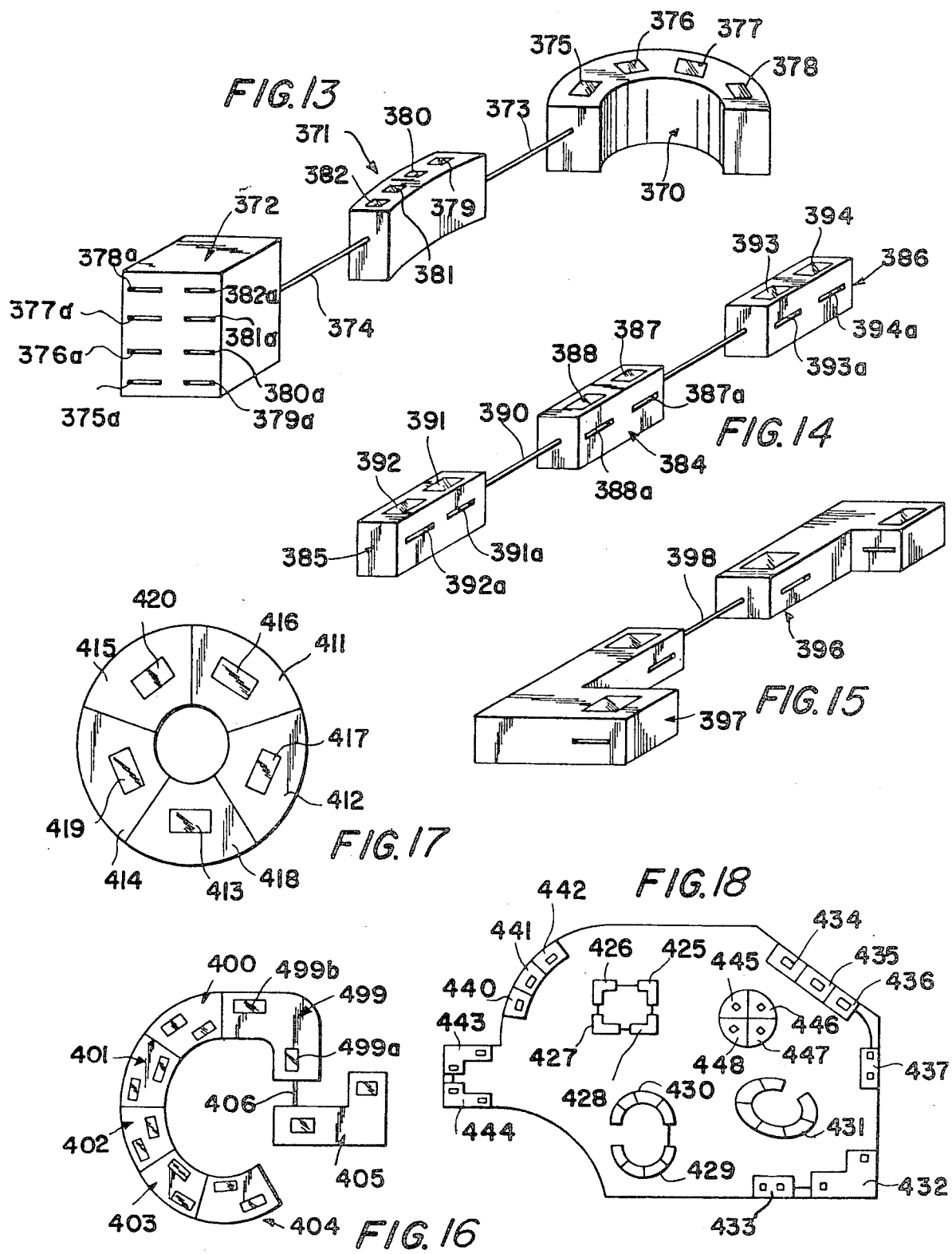

MULTIPLEX PHOTOCOPIER SYSTEM WITH PORTABLE SCANNER

COPENDING APPLICATIONS

This application is a division of Ser. No. 084,851 of Dec. 4, 1979 and Ser. No. 925,290 filed July 17, 1978 now U.S. Pat. No. 4,251,153 which is a continuation-in-part of earlier application Ser. No. 718,260, filed Aug. 27, 1976, now U.S. Pat. No. 4,182,569 and also of earlier application Ser. No. 775,480, filed Mar. 8, 1977 now abandoned.

BACKGROUND OF THE INVENTION

This invention generally relates to improvements in multiplexed photocopier systems, to provide greater capability and greater flexibility than those presently available.

In earlier application Ser. No. 718,260 referred to above, there is disclosed a multiplexed photocopier system having a number of independently usable optical reader stations that are multiplexed with a lesser number of developing and paper feeding mechanisms, enabling a number of users to concurrently use the different scanner stations for making copies. The developing system operates in either a simultaneous mode or in an overlapping time sequence mode, automatically delivering the copies back to the originating station.

In earlier application Ser. No. 775,480, an "adjustable capacity" multiplexed photocopier system of this same kind is provided in which the various functional units of the machine are supplied in the form of seperately housed modules that can be readily interconnected and interfaced with one another in different arrangemen to "tailor make" the copier capacity needs of a particular customer. Thus, for example, a series of separately housed optical reader modules can be coupled to an appropriate lesser number of separate developer modules to supply a desired capacity; and additionally, further optical modules or developer modules may be later added, or some removed, to adjustably change the "capacity" of the system should the needs of that customer increase or decrease at a later time; or to replace any of the modules should they become inoperable or require repair.

SUMMARY OF THE INVENTION

According to the present invention, there is disclosed a similar multiplexed system, but having at least one or more of the optical readers in the form of portable self-contained units, like "cameras", that may be carried about by the users free of connection with the seperate "developer" modules and that may operate in an "off-line" manner to store and record the "video images" observed by the portable units, for later development by a developing machine. In operation, the users employ the portable units, like cameras, to observe and record documents to be copied, at times and locations where a conventional copy machine is not available or not convenient. At such later time and place where a developing machine is available, the recording is "played-back" to the machine, visually observed on a display panel and reproduced in the form of a hard copy.

In one preferred embodiment, the portable optical reader may comprise a hand held optical scanner stylus and a portable magnetic recorder for incrementally recording the "video" signal as the stylus manually scans the page of printing or graphics. Alternatively, a solid-state camera may be employed to observe the entire page and its contents be read-out to an electronic memory or magnetic recorder. The developer module is provided with a sufficient capacity to receive and service a number of such portable hand scanner units, or casettes in the multiplexed fashion previously described in the earlier applications, or may be constructed to provide multiplexed service for a combination of both fixed optic reader stations and such portable units, as might be desired.

BRIEF DESCRIPTION OF THE DRAWINGS

FIG. 10 is a schematic illustration of a different kind of portable optical "camera" for reading and temporarily storing the "video images" from printed documents to be copied, FIG. 11 is an electrical block diagram illustrating the automatic shut-off and display system in the event of malfunction, and FIG. 12 is an electrical block diagram, illustrating the circuitry of FIG. 5.

FIG. 13 is a perspective view schematically illustrating a modular multiplexing system according to the invention, FIGS. 14 and 15 are perspective views, similar to FIG. 13, showing other configurations, FIGS. 16 and 17 are plan views that schematically illustrate still other modular system configurations, and FIG. 18 is a plan view of a room illustrating the arrangement of a number of different modular system configurations inside the room.

DETAILED DESCRIPTION OF PREFERRED EMBODIMENTS

Figure 1:
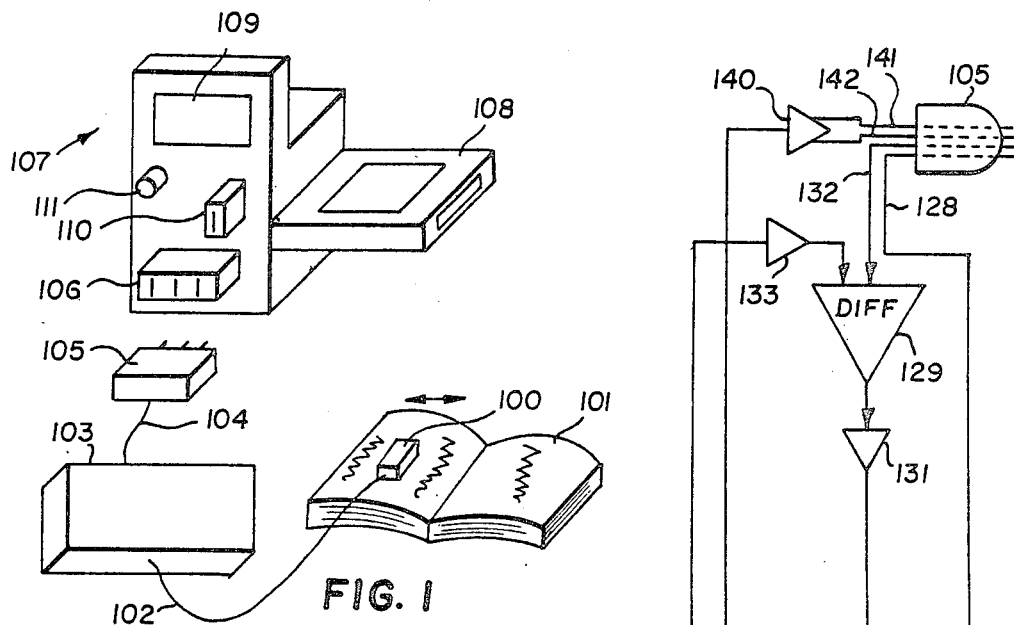
FIG. 1 is a perspective view of a system according to the invention, showing a stationary developer module and a portable optical reader unit that is detachably connectable to the developer module.

Referring to the drawings, there is schematically shown in FIG. 1 a portable optical hand scanner unit 100 or "camera" disposed over the pages of a document to be copied, such as the open leave of a book 101. The hand scanner 100 is coupled by a flexible electrical cable 102 to a portable, battery operated magnetic cassette recorder unit 103 where a magnetic recording of the "video" data scanned by the optical reader is incrementally recorded as the scanner reads the document, together with a control signal having a changing value related to the rate of movement of the hand operated scanner 100, as will be discussed in greater detail below. The magnetic cassette recorder unit 103 may itself be a conventional type of small, portable, constant speed, battery operated unit, as is presently available on the open market, modified to the extent of providing an additional recording track 12 and recording head for recording a "speed" control signal in a seperate magnetic track 124 alongside the track 122 having the "video" data signal. The cassette recorder unit 103 is provided with a readout cable 104 and detachable plug connector 105, as shown, for detachable interconnection with a mating plug receptacle 106 disposed on a stationary electrostatic developer module 107.

As will be described in greater detail below, the developer module 107 is preferably a self-contained, multiplexed, electrostatic copier unit having, in addition, one or more attached, stationary optical reading stations 108, and including in its interior an electrostatic developing mechanism and paper feed mechanism for providing hard copy reproductions of the documents to be copied.

The stationary developer module unit 107 includes one or more receptacles 106 for detachably receiving the play-back plugs 105 from the outlet cables 104 of the portable magnetic cassette recorders 103, or a slot [not shown] for receiving the magnetic cassette, and also includes various internal interfaces and internal controls, to be described, for receiving and multiplexing the recorded "video" signal from the portable magnetic cassette unit 103, to provide hard copy reproductions of the documents 101 scanned by any one of the portable hand readers 100.

In a preferred embodiment, the electrostatic developer unit 107 still further includes one or more video display screens 109 for visually displaying the "video" image played back from the magnetic cassette recorders 103, and may also include coin operated switch controls 110 together with various "on-off", "light-dark" and other copy mailing controls 111, as are customarily supplied on conventional copy machines.

For copying documents, the user manually sweeps his portable optical hand reader unit 100 across the page of the document 101 to be copied, traversing entire page in a number of vertically displaced horizontal sweeps to cover the printed image to be copied. An internally located optical sensor within the hand scanner 100 incrementally observes the image, and provides an incrementally changing analog electrical data signal that varies in intensity with the light-dark areas of the printed image as it is scanned. This analog signal is magnetically recorded by the magnetic cassette recorder 103 in a conventional fashion to provide a magnetically "stored," video image of the printed document to be copied. This "stored" image of the page or pages is retained in the portable magnetic cassette 103 until such time as a copy machine is conventionally available or when the user desires to make a hard copy reproduction. At that time the user plugs the portable recorder 103, by outlet plug 105, into an available stationary copy making machine 107, turns on the machine, and the machine 107 receives the recorded video image by play-back from the cassette 103 and prepares and delivers a hard copy reproduction thereof. Alternatively, the machine 107 may be provided with a cassette receptacle [not shown] to receive the recorded cassette from record 103 and play-back and reproduce its contents.

Figure 2:
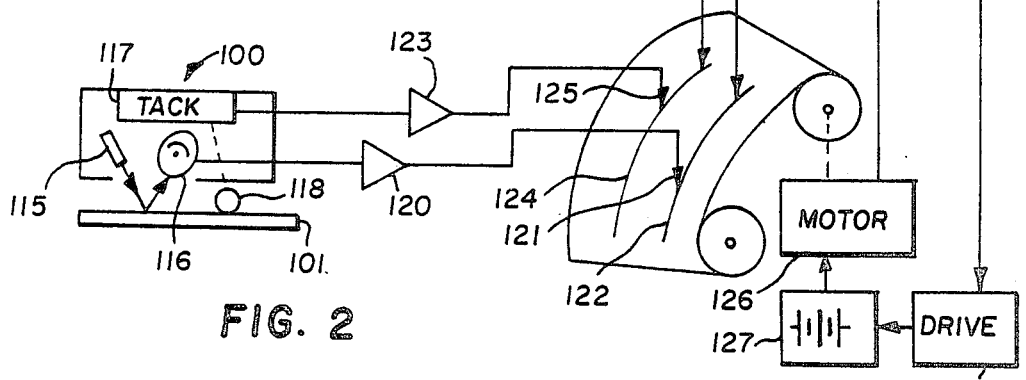
FIG. 2 is a electrical schematic illustration of the portable electrical reader unit and a magnetic cassette recorder unit.

As shown in FIG. 2 the portable hand scanner unit 100 includes a battery powered light 115 for illuminating the printed or graphic data on the page 101 and a photosensor 116, including a bank of photocells or an integrated charge coupled device. The sensor 116 receives the reflected light that incrementally changes in intensity corresponding to changes in the black-white image as the scanner traverses the page. This analog data signal from photosensor 110 is suitably amplified at 120 and applied to a first recording head 121 in the cassette recorder 103 to record the "video" data signal on a first track 122 of the magnetic tape.

A miniature tachometer 117 is also provided inside the hand scanner unit 100 and driven by a friction wheel 118 that engages the surface of document 101 as the hand scanner 100 is manually swept across the sheet 101 during each horizontal scan. This tachometer 117 produces a variable frequency "control" signal proportional to the changing speed of movement of the hand scanner 100, and this "control" signal is amplified at 123 and applied to a second record head 125 for recording a variable frequency analog "control" signal on the second track 124 disposed alongside the "video" data track 122. Since the magnetic cassette tape is driven during recording at a substantially constant speed by a battery 127 powering its motor drive 126, it will be noted that the video signal being recorded on track 122 will be entered on the tape at a variable rate, that varies with the speed of manual movement of the hand scanner 100 over the page. The frequency of the "control" signal being recorded on the second track 125 from the tachometer 117 also correspondingly varies according to the speed of movement of the hand scanner 100 across the page 101. Accordingly, to obtain a uniform or constant read-out of the recorded video "data" signal regardless of variations in the speed of hand scanning the document 101, the speed of the cassette drive during playback is automatically driven at a variable speed in opposite proportion to the variations in the frequency of the recorded "control" signal. Thus where the recorded TACH signal frequency increases, the playback drive is correspondingly slowed down, and when it decreases, the speed is correspondingly increased.

Returning to FIG. 2., to obtain a constant rate playback of the "stored" "video" signal from the magnetic cassette tape to the stationary developer module 107, a desired constant reference ac signal is produced by the developer module unit 107 and applied over line 121. This desired constant rate signal is compared in a comparator 129 with the variable frequency ac "control" obtained during playback from the second track 122 of the tape [TACH signal], and the "error" signal or difference between these two signals obtained at 129 is amplified at 131 to adjustably control the speed of play-back drive motor 126, to reduce or minimize this error. In this manner, by varying the drive speed of the magnetic tape during playback, the recorded "video" track 122 is played back at a variable speed in opposition to the variations in the speed of scanning of the hand scanner 100 during the initial scanning of the page, thereby to provide an effectively constant scanning of the document 101 despite variations in the manual speed of the hand scanner 100. Thus during hand scanning of the document 101, the video signal from the manual scanner 100 erroneously records the "video" at a rate proportional to any variations or changes in the rate of manual movement of the stylus. However, during playback, these manual errors are corrected by playing-back the magnetic record at changing speeds in opposition to the recording speed errors.

For energizing the motor 126 of the magnetic cassette during playback, a dc power signal is produced in the developer module unit 107 and is applied over line 128 to the portable cassette unit 103. This power signal is applied to a logic circuit 130 an thense to a battery-relay circuit 127 to disconnect the internal battery (not shown) within the cassette recorder unit 103 and to substitute dc power signal 128 from the developer module 107 to drive the cassette motor 126. As discussed above, the play-back motor control circuitry varies the speed of motor 126 during play-back according to the speed "error" derived from the recorded "control" signal to provide a constant "video" playback of the recorded information.

Figure 3:
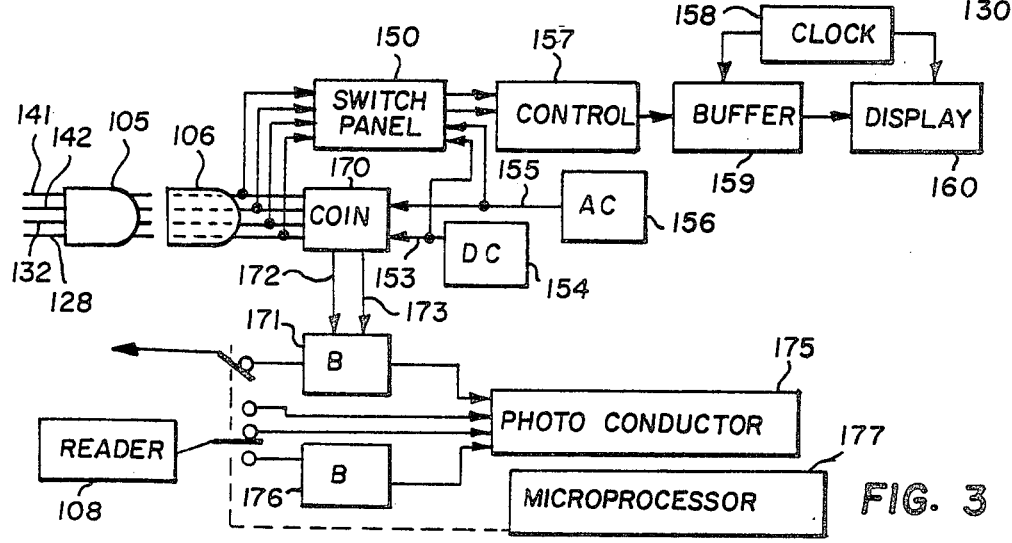
FIG. 3 is an electrical block diagram of the circuitry in the stationary developer module.

FIG. 3 illustrates in electrical block diagram form, details of the circuitry of the multiplexed developer module 107, for receiving the recorded video "data" signal from the portable scanner unit 100 and magnetic cassette unit 103 and for producing a visual display of the recorded video "data", as well as a hard copy reproduction thereof.

As shown, when the user of a portable scanner unit desires to reproduce a magnetically "stored" video image, or images that have been previously recorded, the detachable plug 105 from the portable recording unit is inserted into any available receptacle 106 of a stationary developer module 107. This interconnects the play-back video "data" lines 141, 142 from the magnetic cassette play-back heads to the developer module 107 as well as connecting the dc power source 154 of the module over line 153 to the line 128 of the cassette recorder 103. This plug also connects the ac "reference speed" line from source 156 in the module 107 over line 155 to input line 132 of the cassette recorder 103. Within the stationary developer module 107 all of these lines also pass through the visual display control switch panel 150 and coin operated switches 170; and upon the user actuating the switches 150 and 170, the system is placed into operation to provide a visual display on unit 160 of the recorded video "data" from the portable cassette recording 103 unit.

Referring to FIG. 3, the data lines 141, 142 from the play-back heads of the magnetic cassette are initially connected through the visual display switching panel 150 to a display control circuit 157, that permits the adjustment of light intensity of the display and provides other conventional controls and adjustments governing the visual display at 160. Thereafter these "video" "data" signals are directed to an analog buffer storage unit 159 where the video "data" signals are again temporarily recorded for syncronization with a TV visual display 160. As will be appreciated, the buffer storage unit 159 preferably operates as a continuous recording and playback device that is speed controlled by the same reference clock 158 that controls the scanning of the TV type visual display 160. The video "data" signals from the portable recording cassette 103 are therefore played back from buffer storage 159 and applied to the display 160 in a synchronized manner to yield a visual display of the previously recorded image of the document. The video display switch panel 150 also applies the dc drive power signal from 154 to line 128 of the recorder 103 for driving the portable magnetic cassette unit 103 during playback, and applies the ac speed reference signal from 156 through the switch panel 150 to line 132 of the cassette recorder 103 to provide the playback speed reference signal for controlling the speed of playback of the magnetic cassette tape. Therefore, upon the user plugging in his portable video recording unit 103 to the stationary developer module 107, and upon actuating the visual display panel switch 150 (operated by panel knob 111 in FIG. 1), the recorded "video" image from the portable magnetic cassette 103 is played back and entered into the buffer storage unit 159, and from there is applied in synchronism to the TV display 160 for displaying a visual image of the previously recorded page.

It will be apparent that the purpose of providing an initial visual display of the recorded image prior to making a hard copy reproduction thereof is to insure that a satisfactory recording of the desired document has been initially recorded by the portable stylus unit 100. If for some reason, the desired image from page 101 has not been satisfactorily recorded, the user is then free to erase the improper or incomplete magnetic recording from his cassette recorder 103 and to return the portable scanner 100 and rescan the text 101 (FIG. 1) and thereby provide a complete or accurate recorded image thereof.

After being satisfied by the visual display 160 that a correct image of the document desired has been "stored" on the magnetic cassette tape, the user then inserts the required payment to operate the coin controlled switch panel 170. Operation of this switch panel 170 applies the cassette playback drive power from 154 to the cassette playback motor as well as applying the speed reference ac signal to control the variable playback speed of the magnetic cassette 103. Playback of the magnetic cassette 103 in this case transfers the recorded video "data" signals over lines 172 and 173 to the video image storage buffer 171, where the data signal is temporarily stored in readiness for application to the photoconductor 175 in the copy making or reproduction portion of the developer module 107.

As previously described in Applicant's earlier patent applications discussed above, and as is shown in FIGS. 3, 4, 5, and 6 in the multiplexed developer module such as in unit 107 (in FIG. there is included a plurality of independently usable optical reader or scan stations that are multiplexed to a lesser number of development units so that a number of different users can independently make use of the same machine by "time-sharing" the same developing apparatus. Thus as is shown in FIG. 4, at least three optical scanner stations 11, 12, and 13 are provided as an integral part of the same common module 10, and are multiplexed a common development and paper feed mechanism in a manner as shown in FIGS. 5 and 6.

As described in greater detail in the earlier applications discussed above, FIG. 5 shows a multiplexing system having two such scan stations 30 and 31 selectively feeding video images to a common electrostatic copy developing mechanism, including a single common photoconductor 41. In this mode, when one of the optical reader stations 30 or 31 is placed in operation, with the other being idle, the machine functions in a direct customary manner by applying the scanned optical image directly to the photoconductor 41 after it has been previously charged by charge unit 43. This charged optical image is then developed by applying toner liquid or particles from 44, and the developed image is transferred to copy paper, supplied from a feed 42, and finally the copy is delivered to the proper one of copy outlets 45 or 46 corresponding to that one of the scan stations 30 or 31 where the image originates. In the event that the other one of the scan stations 31 or 30 is placed in operation while the first station is cycling, the scan image from the other ready station is recorded in an available image storage unit 32 or 33, for "off-line" operation, awaiting availability of the common developer mechanism. When the common developer mechanism has completed its response to the first operated optical station, it then automatically responds to any "stored" images, to again cycle and develop any "stored" images as may exist in storage units 32 or 33.

Figure 4:
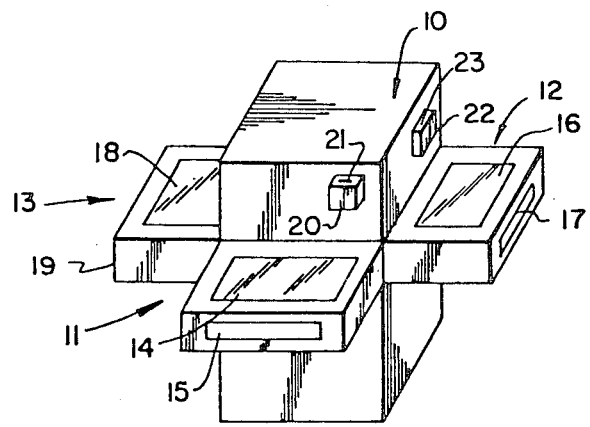
FIG. 4 is a perspective view of the housing of a multiplexed developer module having plural stationary reader stations.
Figure 5:
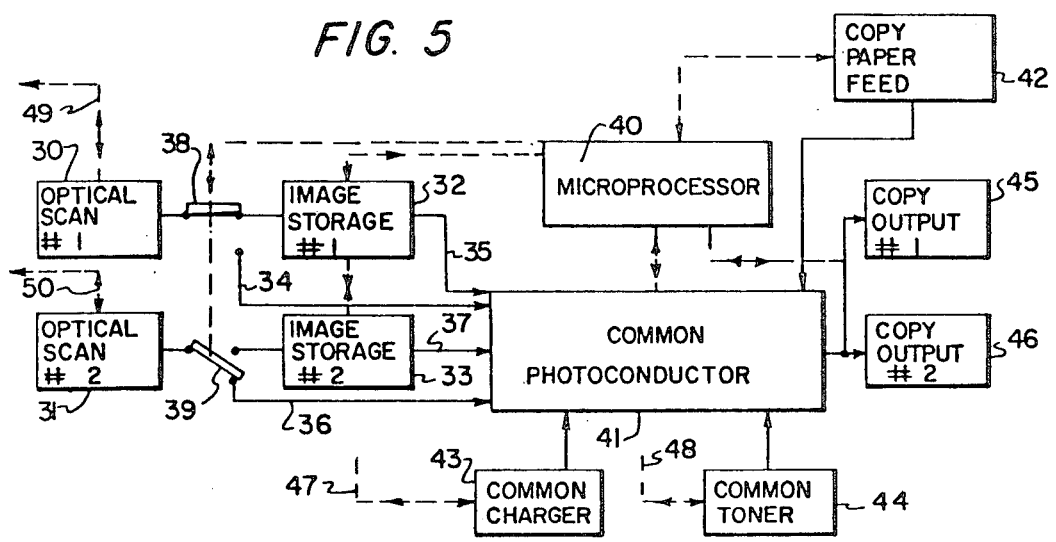
FIG. 5 is a electrical block diagram illustrating the multiplexed electrostatic copy developer system, functioning in a on-line and off-line mode of operation.
Figure 6:
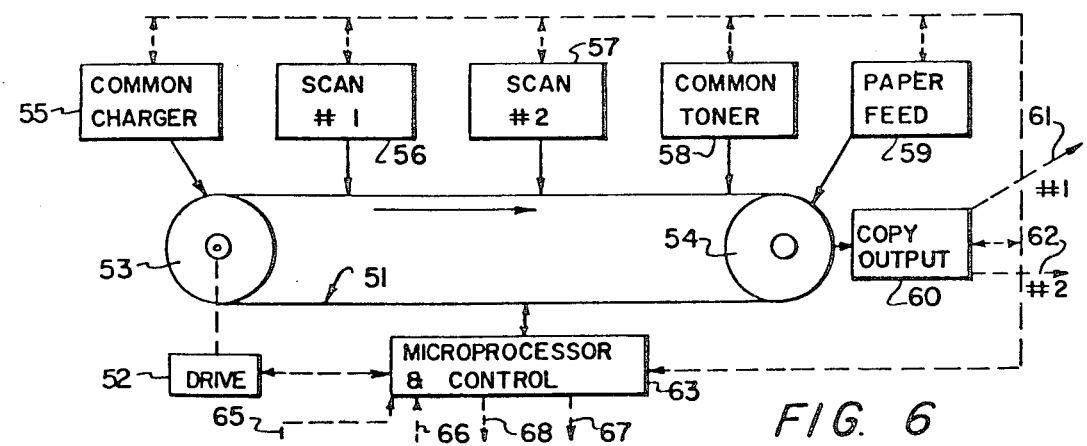
FIG. 6 is an electrical block diagram of a multiplexed electrostatic developer system functioning in a simultaneous mode.

Each of these different optical reader stations is provided with its own associated copy receiving outlet, shown in FIG. 4, at 15, 17, and 19, or in FIG. 5 as 45 and 46, and each hard copy being made is automatically directed to the correct one of these outlet where that image originated. As previously described, this is performed by having each optical reader station 30 and 31 produce its own distinctive digital code or marking signal along with transmitting the image or signals from the image to be copied. This code or mark is stored and/or developed and is reproduced on the copy sheet in the same manner as is the copied image. After development the digital code on the copy sheet is suitably detected inside the module, as will be described, to recognize the originating reading station and to divert that copy document to its proper outlet.

As previously described, it is preferred to employ a microprocessor and related controls 40 to perform these off-line and on-line multiplexing functions as described, since such devices are now standard, on the shelf, integrated chips that have both adequate read-only memory "ROM" capacity, to store an adequate program of instructions, as well as random access memory, "RAM" capacity, to store various control conditions. Furthermore, such chips can all be employed with readily available sensors to monitor the different functions of the machine and to shut off or disable the machine, different components thereof, when the machine or its parts is not functioning in a proper manner. If desired, each optical reader station may also be provided with an indicator panel, to be described, that provides desired signals or messages, in visual and or audible form, informing the user of some malfunction, or instructing about the need for adding toner, paper, or the like. These indicator functions and instruction functions may also be performed under control of the same, or additional microprocessors, or by the use of descrete tailored microelectronic components, as will be described.

FIG. 6, shows the operation of the same or a different machine that is multiplexed to provide simultaneous development of image from plural optical reader stations 56 and 57. Here the plural images are applied simultaneously, or when received, to different areas or regions of an elongated photoconductor 51 in the form of an elongated belt 51 or drum. All of the images are developed during a single cycling of the developer mechanism, by using a common charger 55, common toner 58, common paper feed 59 and the like. A microprocessor 63, or equivalent in discrete circuitry, responds to suitable sensors detecting the operation of each optical scan station to properly control the charger 55, toner mechanism 58 a other mechanisms, to develop all images during each cycle, and to divert the copies to the proper outlets associated with the different optical reader stations.

Where it is desired that the machine always operate in a substantially simultaneous development mode (without storage), regardless of whether the optical reader stations are operated simultaneously, or in different time sequence, each optical station 56 and 57 is monitored, as well as monitoring the position or locations of latent images on the photoconductor 51. By continually monitoring all of these conditions it is known whether a position of the charged photoconductor immediately beneath a given optical readed station is available to receive a latent optical image from that station, or whether that optical reader should be momentarily delayed in scanning awaiting the availability of an unexposed port of the photoconductor 51 (to prevent overlapping of two images). Where overlapping might occur, that optical reader station is briefly time delayed, in its scanning of the document, and then seconds later, it is activated to apply its image to a "clean" portion of the photoconductor drum or belt 51. A microprocessor 63 is preferably employed to control the simultaneous mode of operation of FIG. 6, as well as in the "off-line" mode of FIG. 5. However, it will be appreciated that discrete electronic circuit may be employed for these functions, as will be described.

Returning to FIG. 3, the developer module 107 as employed with portable scanner 100, preferably includes a multiplexing system of the same kind shown in FIGS. 5 or 6, employing a common photoconductor 175 (FIG. 3) and associated components controlled by a microprocessor 177, to develop images received from both one or more stationary optical reader stations attached to the machine, as well as from one or more portable optical scanner units 100 and associated magnetic cassette recorders 103. In a similar manner as previously described, the operation one of the stationary optical reader stations 108 directly applied its optical image to the photoconductor 175 in a "on-line" manner to initiate a development cycle. Alternatively, if the developed mechanism is already cycling at the time such stationary reader station 108 is activated, its image may be temporarily stored in an "off-line" manner by a buffer or image memory 176, and the stored image later applied to the photoconductor 177 for development. However, with respect to the use of portable reader units 100, on the other hand, the generated optical images produced by the portable units are always stored (off-line) in a portable magnetic cassette recorder 103. Therefore upon activation of the developer mechanism 107 by operation of the coin operated switch 170, the portable cassette recorder 103 is played back over data lines 141 and 142 and then over lines 172 and 173 to image storage buffer 171, and thence to the photoconductor 175 for ultimate development of a hard copy reproduction.

Figures 7, 8:
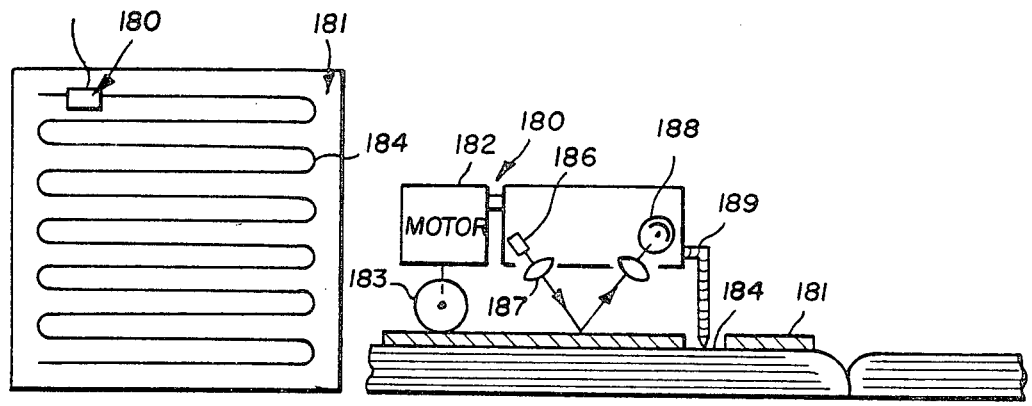
FIG. 7 is a plan view of a templet for guiding a self-scanning portable optical transducer.
FIG. 8 is a sectional view illustrating the use of the self-scanning portable transducer and templet of FIG. 7 on a document to be copied.

As an alternative to manually applied scanning of the transducer 100 as described in FIG. 2 and FIG. 3, a constant speed, motor driven portable scanner 180 may be employed as is illustrated in FIGS. 7 and 8. In this modification, the portable transducer 180 includes a battery powered constant speed motor 182 and friction drive wheel 183, for engaging the surface of a mask or templet overlay 181 that is disposed directly on top of the document 101 to be copied. The templet 181 is in the form of a flat, transparent panel having a continuous guiding groove 184 for guiding the reader 180, provided in the form of a connected series of vertically separated horizontal lines 184 extending to encompass substantially the entire surface area of the templet 181 thereby to guide the motor driven transducer 180 in a series of horizontal sweeps to scan the entire page of the document. As best shown in FIG. 8, the optical reader or transducer 180 includes a light source 186, focusing lenses 187, and a photocell bank 188 for reading the printed lines or graphic data on document 101 as the reader 107 travels at constant speed across the templet 181 to read the lines of the print or other image. The scanner 180 includes a downwardly extending guide arm 189 projecting into the continuous guide groove 184 of the templet 181, thereby to guide the reader 180 along its continuously guided scanning path 184 (FIG. 7). Since the spacing and size of the printed lines or graphic data of the text to be copied varies for different texts and documents to be copied, the vertical spacing apart of the guide groove 184 lines does not attempt to conform with the spacing between printed lines on any particular document, but merely insures that the entire page 101 of data is "read" or scanned by the traveling transducer 180. The size of the optical beam of light 186, the design of the focusing lenses 187, and the banks of photocells 188 are all so designed as to read a horizontal band or area for each sweep that may encompass one or more lines or sections of a graphic area. As noted above, the templet 181 is preferably made of transparent plastic material or the like, for enabling the scanning light beam 186 and reflected rays to pass through the transparent templet 181 for reading the contents of the text or data as it travels across the page of the text 101.

It will be appreciated that with a constant speed motor driven optical reader of FIG. 7, the data being read from the page is entered into the magnetic cassette 103 (FIG. 1) at a uniform rate. Accordingly, it is not necessary to record a separate additional variable frequency "control" signal on a second magnetic track 124 as described above (and shown in FIG. 2), nor is it necessary to reproduce or playback the magnetically recorded cassette tape at a variable speed as previously described. Instead, the data from document 101 to be copied may be both recorded and reproduced at a constant speed cassette drive.

To copy a document 101 in this case, the user merely energizes the constant speed drive motor 182 in the portable reader unit 180, and releases the reader 180 in position at the upper left hand corner of the templet 181 with its guide arm 189 being engaged in the guide groove 184 of the templet 181. The transducer or optical reader 180 is thereafter self-driven by its motor 182 at constant speed to entirely scan the page 101, following the continuous guide groove 184 in the templet at a constant speed of travel. The magnetically recorded data in the cassette 103 reproduced in the stationary developer module 107 (FIG. 1) for an initial visual display of the document 101 on the video display panel 109, as well as being entered into the video image storage buffer 171 (FIG. 3) in readiness for producing a hard copy printed reproduction. Where the recorded "data" in the magnetic cassette 103 is reproduced at a constant speed, the cassette playback drive power signal from 154 and speed reference signal from 165 (FIG. 3) may be dispensed with or disconnected.

It will be appreciated that the developer module 107 of FIG. 1 may be provided with a number of stationary optical scanner stations, such as 108, as well as with a number of cassette playback receptacles 106, and associat equipments, for use by portable optical readers and recorders, such as units 101 and 103 of FIG. 1. On the other hand, if desired, multiplexed developer modules 107 may be provided without stationary optical scan stations 108 for use only with portable readers. As previously described, the optical readers, whether stationary or portable, are adapted to be multiplexed with a common developer apparatus, as is described above in FIGS. 5 and 6. Additionally, in the event that the developer module 107 is equipped to service a number of portable optical scanners 101, it is preferably provided with a similar number of video display panels 109, and associated equipments, for immediate visual display from any plugged-in portable optical reader 100 and/or magnetic cassette 103 reproducer. Alternatively, a lesser number of such video display panels 109 may be used than the number of portable reader receptacles 106, and the portable optical readers 101 may be multiplexed to await their term and "time share" the lesser number of video display panels.

In the embodiments described above, the printed or graphic data to be copied is optically read from the document 101 and magnetically stored in the form of analog signals in a portable magnetic cassette recorder 103. Available magnetic recorders for audio signals, as well as video signals, are capable of recording up to one hour or more in time, that is more than sufficient for recording a number of printed or graphically recorded documents. The user is therefore not required to reproduce or transcribe each document after it is optically scanned and magnetically recorded but instead may retain his magnetic record for a period of time and use it to record and store a number of different documents. After each document is magnetically recorded, the cassette 103 may internally incorporate a tagging generator (not shown) that is actuated by the user to record a detectable "end-of-document" signal or a code on the magnetic tape, as well as operating an odometer or a counter to continuously indicate the number of documents that have been previously recorded. This control information may be used for manual control or for automatic retrieval, to select and visually display any one of the previously magnetically recorded documents on the display panel 109 of the developer module 107, or may be used to selectively reproduce and produce hard copies of any one or more of the magnetically stored documents. Thus, for example, the user may desire to visually display in sequence all of the documents previously read and magnetically recorded, to insure that his records are complete and accurate, but he may wish to make hard printed copies of only selected ones of the magnetically recorded documents. This is readily accomplished in a manual fashion, by having the developer module 107 respond to the receipt of each "end-of-document" recorded code to generate a signal back to 'stop" the playback of the magnetic cassette 103. Thus enables the user to selectively and controllably advance his magnetic tape to the next desired recorded document he wishes to copy, skipping the others, and using the record odometer or counter to inform him when the correct portion of the tape is reached. It will be evident that these same functions may also be readily performed in an automatic manner, if desired, by known automatic document retrieval methods using the "end-of-document" codes on the tape.

Although "analog" recording of the document data is presently considered to be more desirable due to the advantages of having available equipment at reasonable cost, that enables the long time (many documents) recording, it is also well known to provide digital recording and magnetic storage. For example, the U.S. Phillips company employs one or more "RAMS" (Random Access Memory or uses shift registers, for storage of video signals as disclosed in its U.S. Pat. No. 3,993,865. Similarly the Japanese company, Ricoh LTD of Tokyo, Japan, digitizes video signals using a threshold circuit and sampler, and stores the digitized video pulses alternately in a pair of buffer shift registers, as disclosed in U.S. Pat. No. 3,800,000.

A still further advantage, at present, of using analog magnetic recording employing a magnetic cassette recorder, is that additional cassettes can be readily inserted as each becomes filled with recorded data from documents. On the shelf "storage time" for magnetic records is quite long, and therefore "hard" paper copies need not be made from the magnetic recording until needed, or at the convenience of the user, or upon the availability of a developer module 107. The magnetic tapes may also be repetitively replayed without erasure over and over again to make multiple hard copies, at different times, if needed; or the tapes may be erased and rerecorded over and over again when the previously recorded documents are no longer needed. Equivalent recording mechanisms may also be provided for making multiple copies where digital components are used for storage, although the digital components are not yet as convenient, or inexpensive, according to the present state of the art.

In the embodient of FIG. 7, the templet 181 is employed with a motor driven optical reader 180, wherein the reader 180 automatically "runs" over the page 101, following the path of the continuous templet guide grooves 184 to control its direction of movement. For the manually positionable optical scanner 100 of FIG. 1, a similar templet 181 having a guide groove 184, may also be used to guide the portable reader 100, and to insure that the page 101 is completely scanned in a series of properly displaced parallel lines. In either the motor driven or manually driven optical reader, the templet may be otherwise configured to guide the reader to follow other scan patterns, such as a spiral scan pattern (not shown), or other.

FIG. 13 shows a modular multiplexed system according to the invention for the purpose of enabling different users to be individually provided with different copier cababilities to conform with their individual needs. In the above mentioned earliest application, such a modular system is briefly described as having a central or master modular unit, that may include a common development apparatus, and one or more satellite units having optical scanners that are detachably connectable to the master unit, to enable expansion or reduction of the copy making capacity by providing a greater or lesser number of optical scan stations.

In the embodiment of FIG. 13, there is shown a separate master module 370, a separate satellite module 371, and a separate common development and paper feed and supply module 372; all three modules being interconnectable to one another by electrical cabling 373, 374 that is part of a universal bus system that interfaces the modules. In this embodiment, the master module 370 has four optical scan stations 375, 376, 377 and 378 provided in an arcuately shaped cabinet, and the satellite module 371 has an additional four scanners 379 to 382, inclusive, totaling eight optical input scan stations in all. The common control and supply module 372 contains a common development mechanism, or plural development mechanisms, a paper supply and feed mechanism, or mechanisms, and at least some of the control mechanisms, that may include descre circuitry and a digital data processor or microprocessor. A total of eight outlet chutes 375a to 382a are provided to each correspond with each different one of the optical scan stations in both the master module 370 and satellite module 371. It will be appreciated that in this construction, each of the eight optical scanners 375 to 382 converts its scanned optical image to an electrical video signal that is transmitted over the universal bus system 373, 374 to the developer module 372 where the video signal is developed "on-line" or stored "off-line" and later developed, depending upon whether the sequential multiplexing system of FIG. 5 is employed or the simultaneous multiplexing system of FIG. 6 is employed, on whether a variation of the two is used, as has been previously described.

Figure 9:
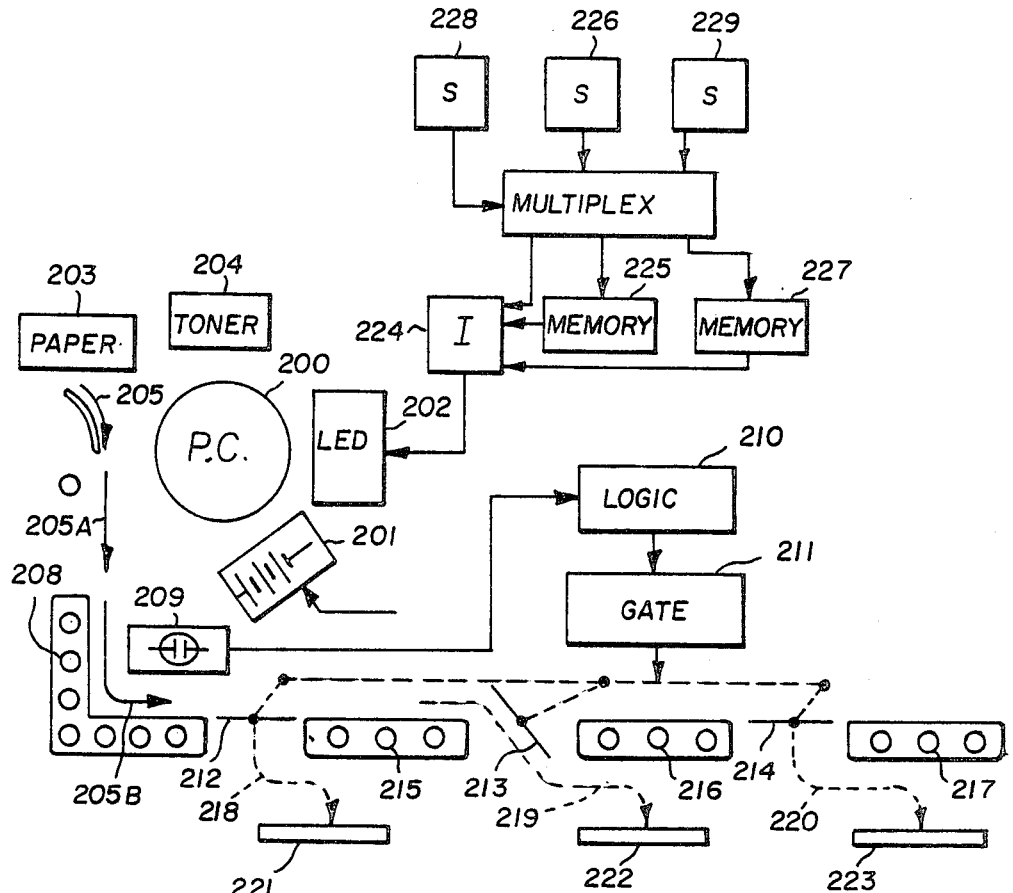
FIG. 9 is a schematic illustration of a paper feed and handling system for automatically separating and delivering copies originating from different users to different copy outlets.

In a variation, the master module 370 and/or the satellite module 371 may include image storage mechanisms, of the kind discussed in FIGS. 2, 5 and 9, for sequential interrogation and development by multiplexing controls that may be contained in the control module 372. In addition to the fixed reader stations 373 to 378 and 380 to 382, the modules may also be provided with the interfacing connections and circuitry of FIG. 3 for receiving portable scanner or reader units of FIGS. 2 and 10.

As will be appreciated, the master module 370 and satellite module 371 may be provided with different numbers of scanning stations, or connections for portable units, to provide different copier capabilities, and each may be housed in a separate modular cabinet of different size, or configuration, so as to be readily accomodated in available spatial areas of rooms or libraries. For example, a rectangularly shaped module 384 as is shown in FIG. 14 may be desired for compact accommodation against the walls, or a pair may be used at the corners of the room. The master module 384 of FIG. 14 may be a smaller, self-contained unit having but two optical scanner stations 387 to 388 and with associated copy delivery outlets 387a and 387b. This master unit 384 may contain a complete multiplexing system of the type of FIGS. 3, 5, or 6 and therefore may be employed by itself in small offices or libraries. On the other hand, for users having greater capacity needs, additional rectangular satellite modules 385 and 386 may be detachably coupled to the master unit 384 by the universal bus system 390 and 389, as shown. In this arrangement of FIG. 14, each of the satellite units 385 and 386 may also comprise a self-contained multiplexed copier having a pair of scan stations, and associated outlet chutes, as well as having its own developer mechanism and paper supply and feed mechanism. Alternately, each satellite unit may share some of the functions components with the master module 384, ranging from merely sharing its digital data processor or circuitry to providing multiplexing operation using a common development mechanism, or other common mechanism as previously described, that are housed in other separate modules.

In FIG. 15, the modules are shown as being housed in separate L-shaped cabinets 396 and 397 that are interconnected by a universal bus 398. This shape of this module is considered to be particularly useful for accomodation in the corners of a room, and when used in groups of four, to provide a rectangularly shaped island for placement centrally in the room or otherwise away from the walls (not shown).

FIGS. 16 and 17 illustrate still additional configurations that are useful for various spatially available areas. In FIG. 16, a series of arcuately shaped modules 399 to 404, inclusive, are abutted end-to-end in series to provide an elongated C-shaped configuration. Each of the modules is provided with two optical scanner stations, such as 399a and 399b, that are alternately arranged near opposite sides of the module to provide greater working areas for the users. By abutting the modules, rather than spacing them apart as in FIGS. 13–15, inclusive, it is obvious that the entire island of copier modules occupies lesser space.

As is believed evident, there is no need for combining modules of the same shape or configuration; whereby arcuately shaped modules may be combined with L-shaped modules, or with rectangularly shaped modules, or with other shapes and sizes. This is generally shown in FIG. 16 by the interconnection of an additional module 405 of L-shaped configuration to the end arcuately shaped module 399 of the enlarged C-shaped island of modules using a universal bus 406.

FIG. 17 illustrates a still further variation in the shape or configuration of the modules to provide a compact spatial combination having a plurality of optical reader stations. In this embodiment there is provided a centrally located cylindrically shaped master module 410 together with a series of five satellite modules 411 to 415, inclusive, that are of truncated pie-shape, and are peripherally arrayed about the central module 410, as shown. In a preferred arrangement, each of the satellite modules 411 to 415 plugs into the central unit, by a concealed universal bus and concealed connector unit (not shown) whereby the combination of all modules compactly nest together to provide a circular outer configuration, as shown. The optical scan stations for each module, 416 to 420, inclusive, are so arranged and placed as to be readily accessible by users that are circumferential spaced (not shown) about the outside of the circular island of modules.

FIG. 18 schematically illustrates but a small number of the many possible arrangements of the differently shaped modules in an enclosed or open room or area having some walls that may be rectilinear, and others that are arcuate; as well as in a room leading to small alcoves, hallways, and other areas. As will be appreciated, the arrangements shown are merely a very few of the many possible configurations that may be employed using the differently shaped modules proposed by the present invention.

As shown, away from the walls and toward the center of the room may be provided a rectangular island comprised of four confronting interconnected L-shaped modules 425 to 428, inclusive. Also away from the walls, may be provided a circular island comprised of two semicircular banks of modules 429 and 430. Still a further arcuate island of modules may be provided in an enlarged C-shaped bank of interconnected modules 431.

At the lower right hand corner of the room may be provided an L-shaped copier module 432 combined with a satellite module 433 of rectangular configuration, located against the wall to supply added copier capacity. At the upper right-hand wall, disposed on at angle to its adjoining walls, can be accommodated a linearly arranged series of rectangularly shaped modules 434 to 436, inclusive, that are abutted against each other, and are interconnected with a still further spaced apart rectangular module 437.

For the upper left hand curved wall, there can be provided three arcuately shaped modules 440 to 442, inclusive, that are abutted end-to-end, and disposed against the wall to also provide a compact arrangement. For use in narrow rectangular hallways, alcoves, and other like spaces, a pair of L-shaped modules 443 and 444 may be employed; or a series of rectangularly shaped modules (not shown).

Pie shaped modules 445 to 448 may be combined to also provide central islands of copiers in the room. However, this configuration provides access to users only at the outside periphery whereas the other "hollow" island configurations shown provides access both inside and outside the island, but less desirably, occupies a greater spatial area than the pie-shaped modules.

To optimize the utility of the system for greatest applicability to different users, both large and small, it is preferred that a variety of differently shaped master and satellite module be made available, all with common (or universal bus) interconnection means so that the different units may be intercombine together in various ways to satisfy both the copy making capability needed by the user, and also to provide the different spatial configurations that may be suitably accommodated within the users available rooms or areas. If required for the purpose of providing still greater versatility, the individual modules themselves may be made in modular form, so that a given cabinet or housing configuration may contain a greater, lesser, or different kind of functional component or part of the copier system. In this manner, optimized systems may be assembled that are best tailored for the needs of the particular users.

All of the differently shaped housing modules described and shown in FIGS. 13 to 18, inclusive, are preferably provided with plug-in receptacles and associated multiplex circuitry, as described above in FIGS. 1, 2, and 3 for use with the portable "camera" units of FIGS. 1, 2, 7, 8, and 10 discussed above. Such modules are also provided with TV display screens 109 as described. If desired, separate modules may be provided with only plug-in receptacles, circuitry, and display without fixed optical reader stations.

FIG. 9 shows a preferred copy sheet feed and automatic copy separation sub-system, for delivering each of the copies to a different one of a plurality of copy outlets 221, 222 and 223 corresponding to, or associated with, the particular one of the optical scan stations, such as 226, 228 and 229, where that image originated from, as employed in the on-line, off-line system of FIG. 5.

Presupposing the operation of optical scan station 226, the optical image of the document being read at that station is either applied directly to optical imager 224 for direct application to an led light bank 202 and exposure of photoconductor 200 in an on-line manner, or the image is alternatively entered into an available one of the memory units 225, 227 for off-line operation, as is described above in the operation of FIG. 5. In either event, a latent electrostatic charged image of that document being read is formed on a photoconductor drum 200, that has been previously charged by high voltage charger 201. Concurrently with the application of this image to the drum 200, or memory, the scan station 226 also transmits a simple unique code in the form of dots or bars that serves to identify and distinguish that station 226 over other optical stations, such as 228 or 229. For example, station 228 may be assigned simple code of "1" dot by means of a simple permanent visible dot marking located at the base of the glass platen upon which the original document is placed for scanning, station 226 may be assigned a different code of "2" by using two such permanent black dots on its glass platen [not shown] and station 229 assigned a code of "3". After reading the image on the document, the light beam at station 226 also transmits this code of "2" [two dots] to the memory or imager 224 and light bank 202, and ultimately both the image on the document and the identity code "2" of station 226 are applied to the photoconductor 200 to be reproduced. This latent identity code image is reproduced in visible form along with the image of the document when the toner 204 is applied to the drum 200 during development, and both the toned visible image and identity code area, in turn, transferred to a copy sheet 205 that is fed to the drum 200 by a paper feed mechanism 203.

After receiving by transfer from the drum 200 both the tone image and identity code, the copy sheet now located at position 205a is then delivered to a conveyor 208 for ultimate delivery to an outlet. However, first it is carried past an optical code detector 209 where the unique identity code "2" on the copy is read by the detector 209. Code detector 209, employing photocells, energizes a logic circuit 210 that, in turn, selectively actuates a proper one of a series of deflector gates 212, 213, or 214 according to the particular code detected. Presupposing that copy outlet 222 is associated with optical scanner station 226, the detection of dot code "2" on the copy at position 205a is noted and outlet logic circuit 210 operates the proper deflection gate 213, leading to channel 219 and to the correct copy outlet 222.

As shown, the series of gates 212, 213, and 214 are disposed in spaced apart arrangement along the path of the document being fed by the conveyor sections 208, 215, 216, and 217. Therefore the actuation of the gate 213 diverts the document at position 205c into outlet channel 219 leading to proper copy outlet 222. All of these different copy receiving outlets 221, 222, 223, and others, may be provided close together in a single or double bank as shown in module 72 in FIG. 13, or alternatively they may be displaced apart from one another and disposed alongside their associated optical scanning stations, as shown in FIGS. 4, 14, and 15.

An alternative system for automatically separating and feeding copies into different outlets according to different digital codes on the documents is disclosed in U.S. Pat. Nos. 3,650,204 and 3,804,005. In these patents the different copy receiving outlets are disposed in a common area alongside each other as in the embodiment of FIG. 13.

FIG. 10 shows the simultaneous reading of a document image by a portable camera unit, that may include a chargedcoupled photosensor receptor array 301 coupled to a memory or storage 303 for retaining the optical image. As shown, the camera unit preferably includes a syncronized electronic flash transmitter 304 for illuminating the document 300 with high intensity light, and a focusable lens 305 for applying the reflected image from the document to the solid state sensor 301. Conventional charge coupled sensor units have an inherant memory capacity, and are incrementally scannable by a clock 302 and shift register 307 to read-out the image in electrical form over an output line 308 to the memory or recorder 303. The focusable lens system 305 may be provided as an adjustable zoom lens to permit documents of different sizes and shapes to be focused upon the CCD sensor array 301.

In the same manner as discussed above in FIGS. 1 and 2, the observed image from document 300 is stored or retained in either electrical or magnetic form in the memory 303, and may be reproduced at the convenience of the user by coupling the portable "camera" unit to an available copy making reproduction unit as described above in FIG. 1. Many different solid state cameras of this kind are presently available, and a further description herein is therefore considered to be unnecessary.

FIG. 11 discloses a preferred circuit for providing an automatic display or an audible annunciation of any malfunction to the user, and/or an automatic shutoff of the entire machine, or any individual sections thereof, in the event of any such malfunction.

As shown in FIG. 11, each of the individual functioning units of the machine is provided with one or more electrical transducers 400, 401, 402, 403, 419 and the like, for monitoring its performance, and producing an electrical signal corresponding to the sensed condition. These signals are digitized by conventional A to D convertors 404 to 407 and 420, and each monitored digitized signal is then applied to a comparator circuit including 412 to 415 and 422 where it is compared to a preset point or reference 423 to 427, inclusive. All of the essential sub-systems employed in the multiplexed machine are monitored in this manner and in the event of malfunction of any such essential system, a malfunction signal is directed to "OR" circuit 416 that directs a shut-off signal to the shut-off power relay circuit 417 for disconnecting the power from the various stations. Additionally, this shut-off signal from "OR" circuit 416 is applied to a display and/or annunciator circuit 418 to visually indicate and/or audibly announce the source of the malfunction. The display and annunciator 418 also is energized by each of the comparator circuits 412 to 415 and 422 to identify the source of the malfunction. This, for example, should the paper feed subsystem suffer a jam or otherwise malfunction, a signal is produced by a paper feed detecting transducer 400 and is determined to be a malfunction by comparison of this signal with that of set reference 423. Since the proper paper feed operation is essential to all optical stations [in the event of a single paper feed for all stations], the resulting malfunction signal is directed through "OR" circuit 416 to the shut-off power circuit 417 thereby to deenergize all of the optical scan stations. Additionally, the same shut-off signal is applied to the display and annunciator circuit 418. A second signal from the paper detecting channel is directed from comparator 412 to the display circuit 418 to identify the cause of the malfunction, and the combination of these two signals are employed to energize the appropriate display message [visual and/or audible] to notify the users and the repair personnel of the cause for malfunction.

In addition to monitoring and controlling those subsystems that commonly affect all optical reader stations, it is preferred to provide similar controls for selectively disconnecting the power and displaying the malfunction of individual ones of the stations where such malfunction would only affect the operability of only that station but not the others. This is performed in a similar manner by monitoring the sub-systems of specific stations such as the optical reader 430, the outlet gates for those stations, the on-off, coin operated and other controls for each such station, and other functioning subsystems for the individual stations. These monitored signals that only affect individual ones of the channels are processed in a similar manner, by converting the transduced signals into digital form by A to D converters, such as 431; comparing the signals to a preset reference 433 in comparator 432; and applying any malfunctioning resulting signal to the partial shut-off circuit 438. However, unlike the main power disconnect 417 that disconnects all power, the partial shut-off 438 disconnects only the power to the affected channel relating to that particular malfunctioning scan station. A separate display and audible signaling sub-system 439 is provided from each channel and this display/indicator 439 is energized by both the malfunction error signal, the shut-off signal from 438, and the command signal from the on-off or coin operated control 440. Upon the user requesting a copy function by operation of switch 440, the display/indicator 439 signals the presence of the particular malfunction and returns the coin, if necessary. Each scan channel is provided with a number of transducers, such as 430, and associated circuits, to monitor the essential functions and all resulting "error" or "malfunction" signals for each channel are coupled through "OR" circuit 434, as shown, to operate the partial shut-off 438 and display/indicator 439 in the manner described. FIG. 12 shows a multiplexed photocopying system similar to FIG. 5, and operating in an on-line, off-line mode, but employing integrated logic circuitry instead of a microprocessor, for controlling the multiplexing operations. The system shown includes a pair of independantly operable scanning stations 500 and 501 combined with image storage or a recorder 502, for multiplexing off-line operation as previously described. Additionally the system includes a common electrostatic developer mechanism for making "hard" copies of the scanned images and including a photoconductor drum 503 having a high voltage charger 504, an LED type visual image former 505, a toner or developer feed 506, and a paper feed 507, all being of a conventional construction as is now well known in the art.

To enable the described multiplexing operation, each of the optical reader stations 500 and 501 is provided with selectively operable gate means for either applying the scanned image to be applied directly to the photoconductor 503 in real-time for on-line development, or alternatively transferring the visual image to reproduced into the memory or storage 502 for "off-line" later development into a "hard" copy, when the common development mechanism that is shared by the two readers 500 and 501 becomes available.

As previously discussed, the optical reader or scan station 500, 501 observe the printed or graphic data to be reproduced employing photocells, CCD's and like optical-electrical readers, and produce electrical data signals, in either analog or digital form, as their outputs. The gating means, to be described, are conventional electrical circuitry for selective transmission or blocking of the electrical output data signals from the scan stations.

Returning to FIG. 12, the output of the first scan station 500 is directed to gate means 508 for selective transmission of the data signals directly to the LED video imager 505, through "OR" circuit 512, and is also directed to gate means 509 for alternative selective transmission to the image storage medium 502. Similarly the second optical scan station 501 likewise has its output directed to gate means 511 for direct on-line transmission to the LED video imager 505, or alternatively, its output is selectively directed to the second gate means 510 for off-line storing of the video image signal in the memory or storage 502.

For controlling the selective operation of these various gates, there is provided a digital logic circuit that responds to two conditions of the system at the time that each request for making a copy is made to decide whether the video data to be reproduced need be temporarily stored for later development. The first condition that is considered is whether or not the common developer mechanism is already engaged in cycling at the time a request for copying is made. This first condition is detected by a transducer 514 that continuously monitors the photoconductor drum 503 to determine whether it is cycling; and if so, produces a TACH signal to the AND circuit 515 associated with the first scan station 500, and also directs the TACH signal to the AND circuit 520 associated with the second scan station 501.

The AND circuit 514 is also energized by the "on" or command switch signal [eg. coin operated] from the first scan station 50. Therefore, in the event of a command signal produced by the first optical station 500 when the machine is already cycling or developing a previous copy, the AND circuit 514 is enabled to open or "turn-off" the gate 508, and through an inverter circuit 518 alternatively functions to concurrently "turn-on" or close the second gate 509. Opening of gate 508 prevents the video signal from scan station 500 from going directly to the imager 505 for photoconductor 503, and the concurrent closing of gate 509 direct this video signal into the memory 502 for temporary storage of the video image in an off-line manner.

The second condition that is monitored by this logic circuit is whether or not a previously entered video image is preexisting in the storage or memory 502 at the time of a new command received at station 500 to make a copy. This function is performed by employing a flag transducer coupling the memory 502 to a second AND gate 516 associated with the first scan station 500. This second AND gate 516 is also energized by the "on" command or start signal from the first scan station 500 whereby in the event of a new command received from station 500 and the concurrent presence of a previously stored video signal, the second AND gate 516 is activated to "open" or deactivate the gate 508, and to close the gate 509, thereby directing the new video image from scan station 500 into the memory 502. On the other hand, if the developer mechanism is not cycling and there is no preexisting video image stored in the memory 502, a new command for copying received by optical station 500 permits this station to function in an on-line manner and apply its video image directly through normally closed gate 508 to the image former 505 for direct application of the video image to the photoconductor drum 503.

The logic circuitry for the second [and/or additional] optical station 501 is the same as previously described, and includes an AND gate 520 for controlling off-line operation responsively to a command received by station 501 when the developer is cycling, and an AND gate 521 for controlling "off-line" operation in the event of a previously stored video image in the memory 502. Thus any previously stored video images held in the memory 502 are developed first, or given priority in development, over any new command to copy received by either optical staion 500 or 501.

A gate circuit 513 is disposed in the read-out channel from the memory 502 to prevent application of the stored video image into the video imager 505 until such time as the developer mechanism has completed its previous cycle and is readiness to receive and make the next copy. This gate 513 is maintained "off", or is opened, to prevent inadvertant transmission of the stored video signal by the transducer signal from 514 that monitors the cycling condition of the developer mechanism. When the developer mechanism completes its previous cycle, the gate means 513 is closed to readout the stored image from the memory 502 and apply it to the drum 503 via the LED imager. The developer mechanism is controlled by conventional power relays [not shown] to initiate its cycling mode of operation concurrently with the closure of any one of gates 508, 511, or 513 thereby to selectively respond to the scan stations or memory and reproduce the "hard" copies when commanded to do so. As previously discussed, higher speed developer mechanisms are presently available than the time required by individual users to place and remove the masters into and out of the machine. Consequently the machine of the present invention is capable of almost continual operation to rapidly supply the needs of a waiting line of users.

The video image storage unit 502 may comprise a magnetic disc, drum, web or other memory or recorder for storing a number of video images [number of documents]. The recording and readout of the video images from storage is preferably arranged to provide priority to the earliest entries whereby the earliest users receive their hard copies first, in the same order as their use of the scan stations. Alternatively, if the memory units being employed are capable of retaining in storage only one document at a time, a series of such memories may be used, with the plural memories being sequentially interrogated for read-out by a suitable clock means and shift register to afford the same priority of use.

It will be appreciated that the present invention contemplates that more than two scan stations may be multiplexed to a lesser number of memories and to one or more common development mechanisms. For such systems of greater complexity, the logic circuitry governing the on-line or off-line mode of operation of each station is the same as previously described, to always afford priority to the earliest users.

I claim:

1. A copier system having plural independantly operable optical reader stations and a fewer number of developer mechanisms for producing hard copy reproductions of visual images read by said optical reader stations, malfunction indication and control means, said malfunction indication and control means including monitoring means for those operating components of the system that affect only individual reader stations for detecting malfunction of those components, and control and indicator means for each station for deenergizing only the affected stations in response to unacceptable malfunction thereof and indicating the source of malfunction of the affected stations, and additional monitoring means for those operating components of the system that affect all stations, and additional control and indicator means for deenergizing the entire copier system in response to unacceptable malfunction thereof and indicating the source of malfunction.

2. In the system of claim 1, said indicator means comprising a visual indicator.

3. In the system of claim 1, said indicator means comprising an audible indicator.

4. In the system of claim 1, said indicator means comprising both a visual and an audible indicator.

5. In the system of claim 1, said indicator means for each station responsive to a user requesting a copy function by a reader station to actuate said indicator.

6. An electrostatic copier system having plural optical reader stations at least one of which is detachably connectable to the system and a developer mechanism incapable of printing from all stations simultaneously for multiplexing application to the different reader stations according to the priority of usage of the stations, a plurality of "hard copy" delivery outlets each associated with a different one of the optical reader stations, means for identifying the video images produced by each station, and sorting means responsive to said identifying means for delivering each "hard copy" reproduction to the correct delivery outlet, the addition of malfunction indication and control means, said malfunction means comprising means for monitoring those components of the machine that affect all stations and deenergizing the entire machine in response to unacceptable malfunction thereof, and additional means for monitoring those components of the machine that are associated with only particular reader stations and deenergizing only the affected station in response to unacceptable malfunction thereof, and indicator means associated with said malfunction means and additional means for indicating the source of malfunction.

7. In the system of claim 6, said indicator means comprising an audible indicator.

8. In the system of claim 6, said indicator means comprising a visual indicator.

9. In the system of claim 6, said indicator means comprising both a visual and an audible indicator.

10. In the system of claim 6, said indicator means for each station responsive to a user requesting a copy function by a reader station to actuate said indicator.

* * * * *